US008179240B1

(12) United States Patent
Orefice

(10) Patent No.: US 8,179,240 B1

(45) Date of Patent: May 15, 2012

(54) MOTORCYCLE DETECTION AND NOTIFICATION SYSTEM AND ASSOCIATED METHOD

(76) Inventor: Ryan M. Orefice, Canyon Country, AZ (US)

( * ) Notice: Subject to any disclaimer, the term of this patent is extended or adjusted under 35 U.S.C. 154(b) by 495 days.

(21) Appl. No.: 12/533,773

(22) Filed: Jul. 31, 2009

(51) Int. Cl.
*B60Q 1/00* (2006.01)

(52) U.S. Cl. .......................... 340/435; 340/436; 340/903

(58) Field of Classification Search .................. 340/435, 340/436, 471, 472, 903; 348/148
See application file for complete search history.

(56) References Cited

U.S. PATENT DOCUMENTS

| | | | | |
|---|---|---|---|---|
| 5,263,006 | A | 11/1993 | Hermesmeyer | |
| 5,642,238 | A * | 6/1997 | Sala | 348/148 |
| 6,894,608 | B1 * | 5/2005 | Gunderson | 340/471 |
| 7,477,137 | B2 * | 1/2009 | Matsumoto et al. | 340/436 |
| 2010/0194596 | A1 * | 8/2010 | Wang et al. | 348/148 |

* cited by examiner

*Primary Examiner* — John A Tweel, Jr.

(57) ABSTRACT

The present invention concerns that of a new and improved motorcycle-emergency vehicle detection and notification system for use when a motorcycle is in operation in vehicular traffic. As a result, costly and tragic accidents are prevented and, more importantly, precious lives are saved as the system gives a clear indication to avoid a lane change, and to yield to the motorcyclist or emergency vehicle as they approach. By offering both an audible and visual indication that it is, or is not, safe to change lanes, the present invention adds significantly to the safety of a vehicle when driving along streets and highways, which are becoming increasingly congested.

18 Claims, 4 Drawing Sheets

MOTORCYCLE DETECTION AND NOTIFICATION SYSTEM AND ASSOCIATED METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to detection systems and, more particularly, to a motorcycle detection and notification system for providing motorists with an effective means of being aware of the presence of a motorcycle.

2. Background of the Invention

The roads are becoming more and more congested with vehicular traffic. As traffic congestion has increased, the number of accidents has also increased. Some of these accidents can be traced to driver inattentiveness or to the failure of the driver or of other drivers to see and react to surrounding vehicles. This phenomenon is particularly true when it comes to motorcycles and emergency vehicles. Due to their small size, many motorists are unaware of the presence of a motorcyclist until the motorcycle either passes them or travels directly behind them so as to be visible in the rearview mirror and may also be unaware of quickly approaching emergency vehicles, such as fire trucks, ambulances, and police vehicles.

Accordingly, a need remains for a motorcycle-emergency vehicle detection and notification system in order to overcome the above-noted shortcomings. The present invention satisfies such a need by providing a system that is convenient and easy to use, is durable yet lightweight in design, is versatile in its applications, and provides an effective warning system that a motorcycle or emergency vehicle is approaching.

SUMMARY OF THE INVENTION

The present invention concerns that of a new and improved motorcycle-emergency vehicle detection and notification system for use when a motorcycle is in operation in vehicular traffic. As a result, costly and tragic accidents are prevented and, more importantly, precious lives are saved as the system gives a clear indication to avoid a lane change, and to yield to the motorcyclist or emergency vehicle as they approach. By offering both an audible and visual indication that it is, or is not, safe to change lanes, the present invention adds significantly to the safety of a vehicle when driving along streets and highways, which are becoming increasingly congested.

The instant motorcycle-emergency vehicle detection and notification system includes a passive transmitter that is directly attached onto a motorcycle, emergency vehicle, or police car and a receiver that is installed in automobiles. The transmitter includes a housing that has electronic components positioned therein. The transmitter is powered by the motorcycle's, emergency vehicle's, or police car's own power supply, which is crucial for providing a passive transmitter that requires no activation on the part of the user.

The transmitter emits a unique frequency signal, which is important and advantageous for eliminating the possibility of the receiver being inadvertently triggered by spurious signals. The receiver includes a durable housing for holding the components and circuitry of the receiver. The receiver is electrically connected to the automobile's main internal computer relay with the required wiring and is positioned in the vehicle's dash area for ease of access. The receiver includes a sound emitting device and a light emitting diode (LED) display. The receiver components and circuitry are frequency selective, which is crucial for presenting minimum impedance to signals generated on the unique frequency transmitted by the transmitter. The receiver also includes a logic device.

In use, the motorcycle-emergency vehicle detection and notification system is simple and straightforward to operate. Once the transmitter is automatically activated, the transmitter sends signals to every automobile equipped with a receiver that is within a range of 300 feet. These signals emit outward from the front of the motorcycle at an angle of approximately one hundred forty degrees (140°). Upon reception of the signal generated by the transmitter, the circuitry in the receiver generate an 'enable' signal to the logic device which applies a voltage level to the receiver, thus activating the warning for the motorist. This warning is achieved by a beeping sound and/or by flashing the LED indicator lights displayed on the dashboard of the vehicle.

The LED indicator light for the motorcycle flashes when a motorcycle is detected while the indicator light for a fire truck or ambulance flashes upon detection of either a fire truck or ambulance. Also, a separate indicator light for a police vehicle flashes upon detection of a police vehicle. Separate LED vicinity lights running across the receiver face increasingly illuminate from left to right and from green to yellow to red as a motorcycle, emergency vehicle, or police car equipped with a system transmitter increasingly approaches an automobile equipped with a system receiver. An additional warning is provided in the form of an image on the automobile's side mirror which is activated as a motorcycle upon receipt of a unique frequency signal for a motorcycle, as an emergency vehicle upon receipt of a unique frequency signal for an emergency signal, including a fire truck or ambulance, or upon receipt of a unique frequency signal for a police car.

When the receiver is activated, the indicator lights, vicinity indicators, and sound from a sound emitting device, as well as an image displayed on the side mirror, signify the presence of a motorcycle, emergency vehicle, or police car in close proximity to the automobile, thereby notifying the automobile driver to pay extra attention while driving so as to not endanger the motorcyclist or occupants of an emergency vehicle or police car.

There has thus been outlined, rather broadly, the more important features of a motorcycle detection and notification system that the detailed description thereof that follows may be better understood and in order that the present contribution to the art may be better appreciated. There are, of course, additional features of the motorcycle detection and notification system that will be described hereinafter and which will form the subject matter of the claims appended hereto.

In this respect, before explaining at least one embodiment of the motorcycle detection and notification system in detail, it is to be understood that the motorcycle detection and notification system is not limited in its application to the details of construction and to the arrangements of the components set forth in the following description or illustrated in the drawings. The motorcycle detection and notification system is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present motorcycle detection and notification system. It is important, therefore, that the claims be regarded as including such equivalent constructions insofar as they do not depart from the spirit and scope of the present invention.

It is therefore an object of the present invention to provide a motorcycle detection and notification system which has all of the advantages of the prior art and none of the disadvantages.

It is another object of the present invention to provide a motorcycle detection and notification system which may be easily and efficiently manufactured and marketed.

It is another object of the present invention to provide a motorcycle detection and notification system which is of durable and reliable construction.

It is yet another object of the present invention to provide a motorcycle detection and notification system which is economically affordable and available for relevant market segment of the purchasing public.

Other objects, features and advantages of the present invention will become more readily apparent from the following detailed description of the preferred embodiment when considered with the attached drawings and appended claims.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
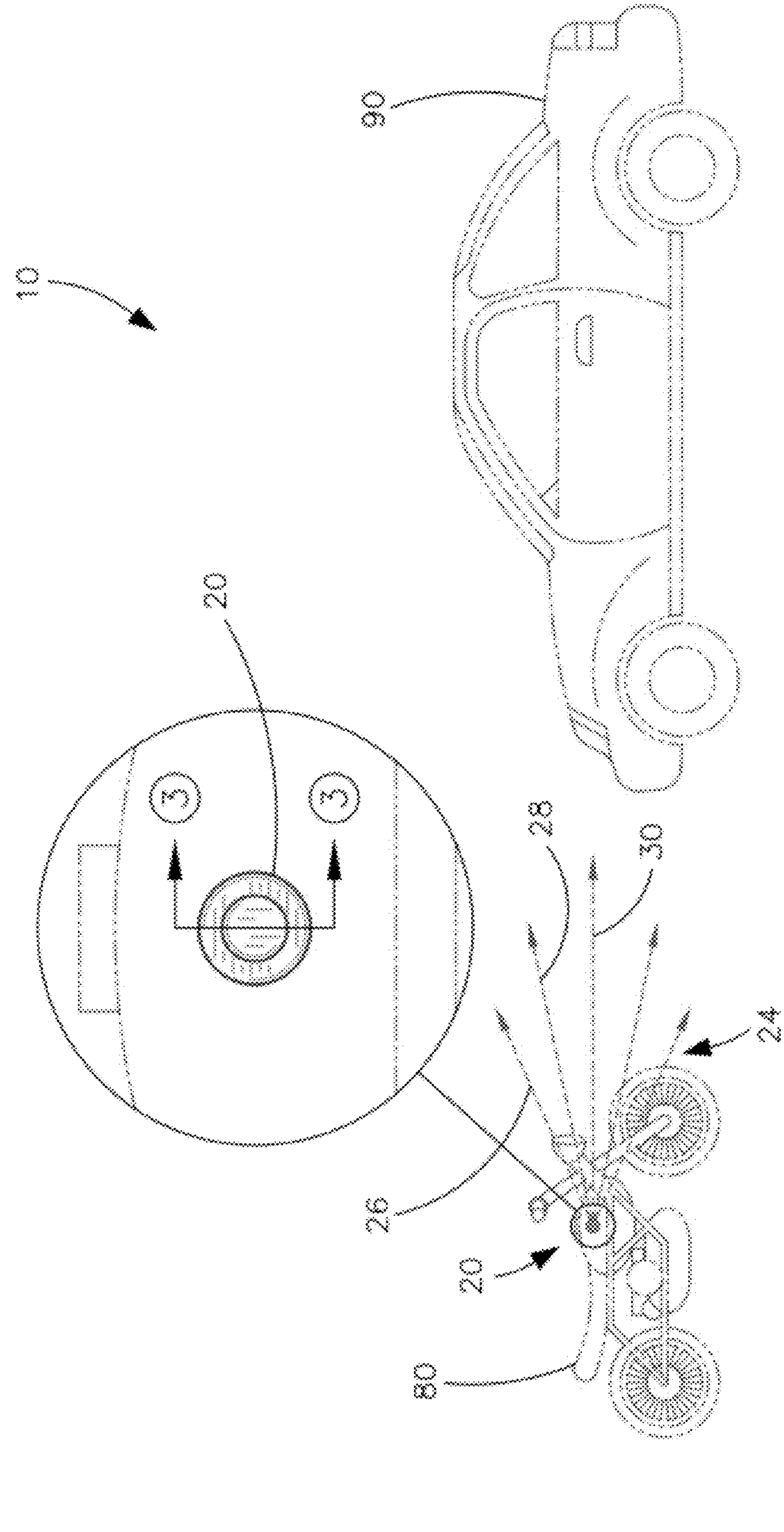
FIG. 1 is an in-use side elevation view with a detail of a transmitter of the system installed on a motorcycle.
Figure 2:
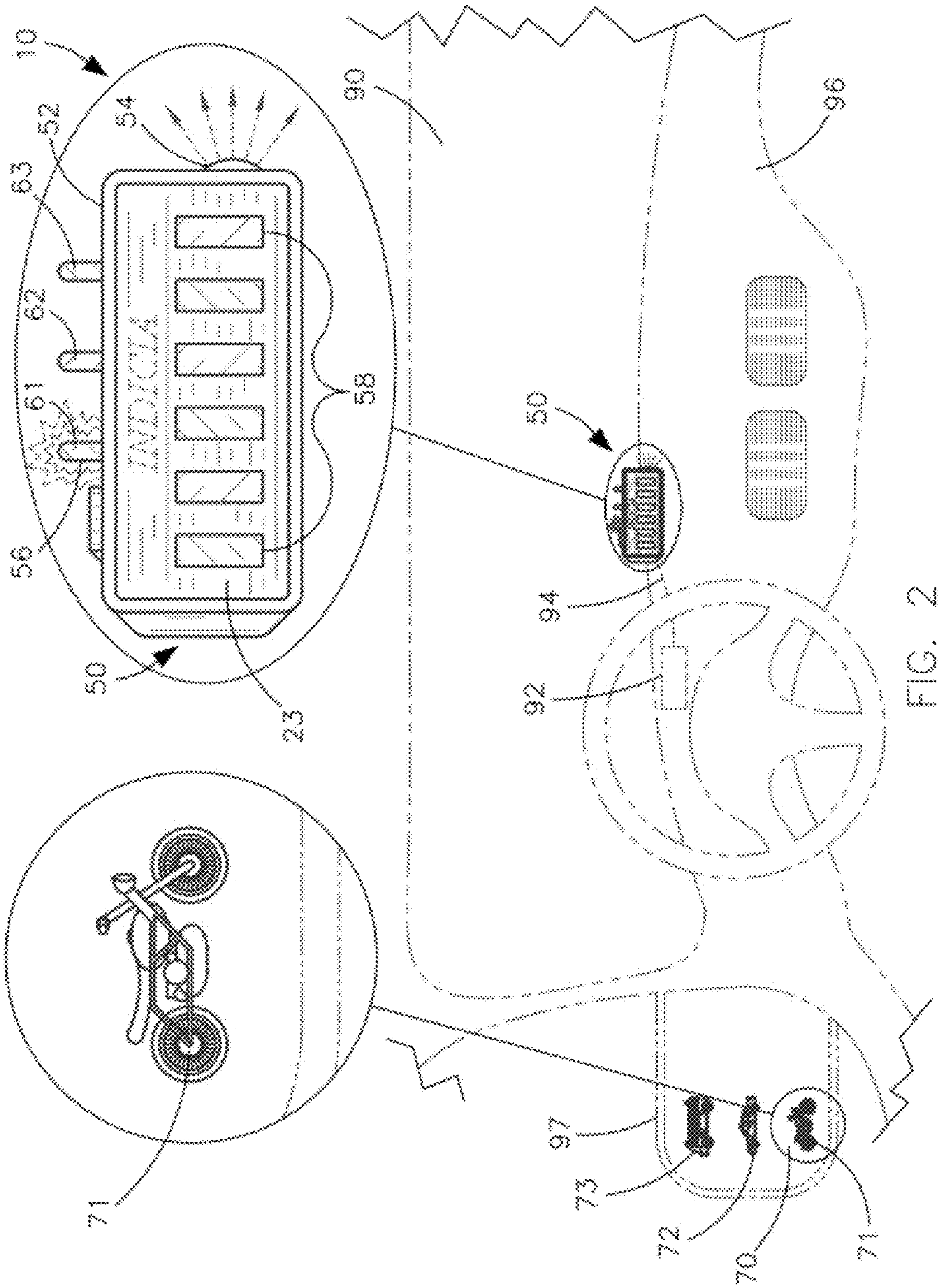
FIG. 2 is an in-use front elevation view with a detail of a receiver of the system installed in a vehicle.
Figure 3:
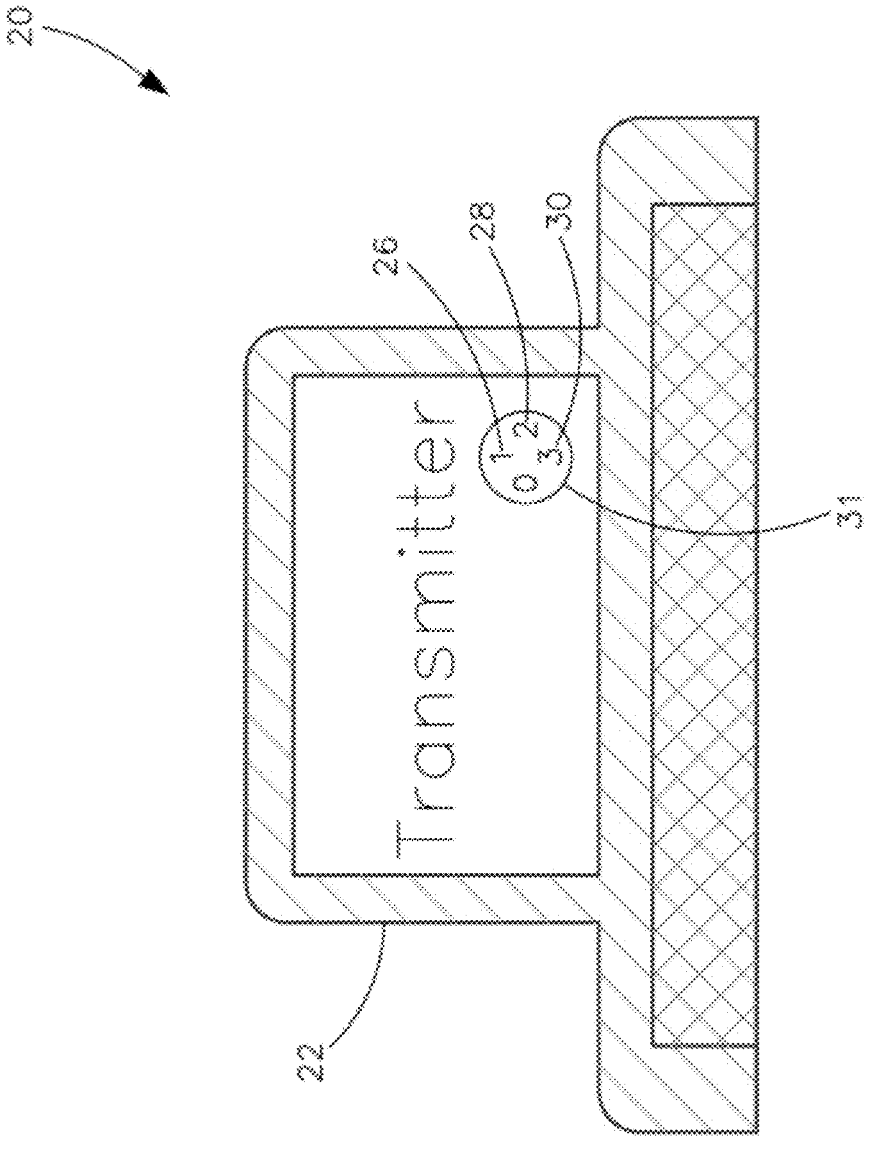
FIG. 3 is a front elevation of a transmitter.
Figure 4:
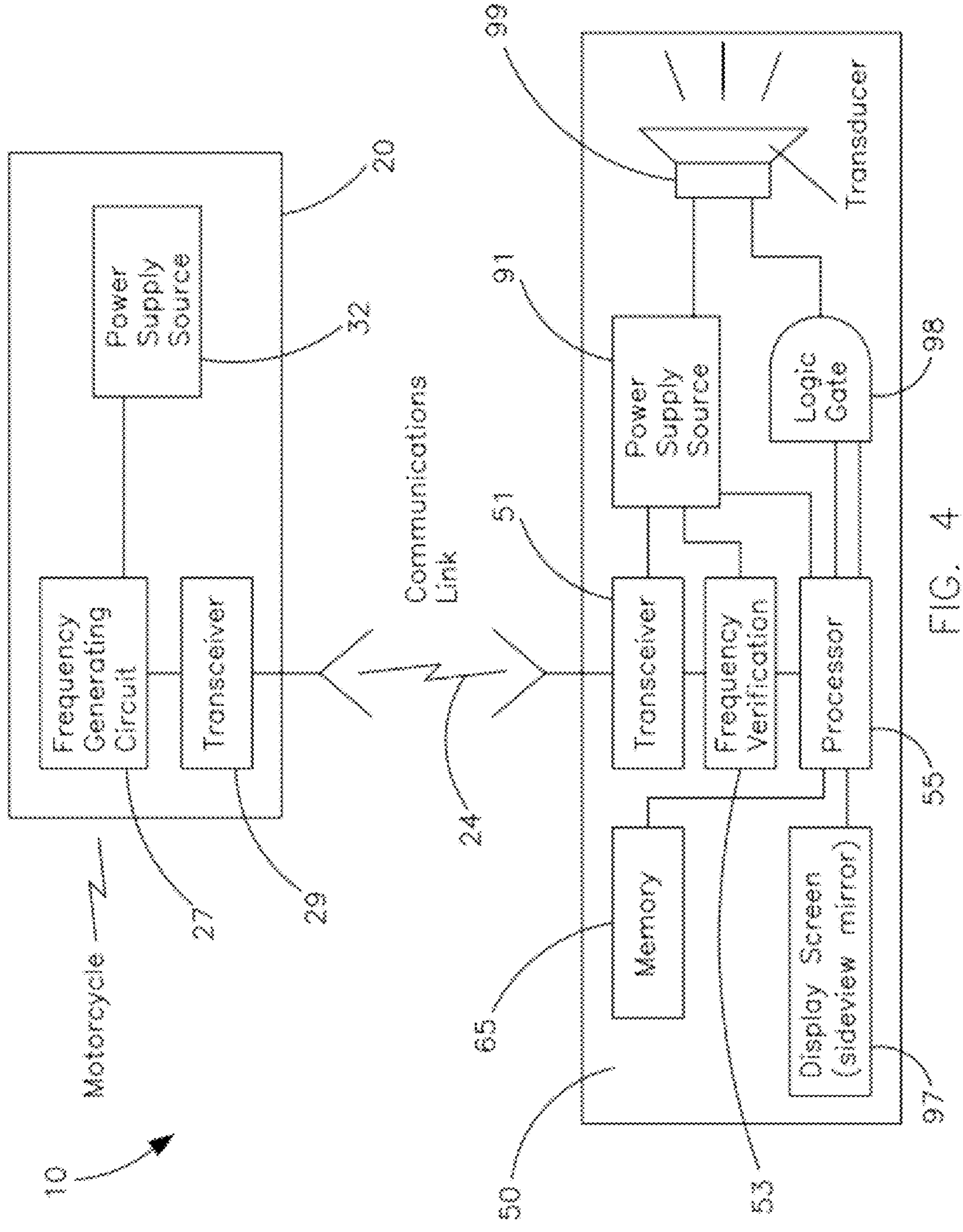
FIG. 4 is a schematic diagram showing the interrelationship between the major components of the operation of the system.

With reference now to the drawings, and in particular to FIGS. 1 through 4 thereof, a new motorcycle detection and notification system embodying the principles and concepts of the present invention and generally designated by the reference numeral 10 will be described. As best illustrated in FIGS. 1 through 4, the present motorcycle detection and notification system 10 is utilized in conjunction with a motorcycle 4 that is used by an individual for riding purposes, an emergency vehicle, or a police car.

The present motorcycle-emergency vehicle detection and notification system 10 is designed for use when a motorcycle, emergency vehicle, or police car, collectively referred to as "vehicle" 80, is in operation in vehicular traffic. The instant motorcycle-emergency vehicle detection and notification system 10 includes a passive transmitter 20 that is attached on a vehicle 80 and a receiver 50 that is installed in automobiles 90. The transmitter 20 may include a housing 22 that has electronic components positioned therein to operate the transmitter 20.

The transmitter 20 is powered by the vehicle's 80 own power supply, such as a cigarette lighter or stock car wiring harness or batteries, which is crucial for providing a passive transmitter 20 that requires no activation on the part of the user. The transmitter 20 emits a selected unique frequency signal 24, which is important and advantageous for eliminating the possibility of the receiver 50 being inadvertently triggered by spurious signals.

The unique frequency signal 24 may be a first frequency signal 26, a second frequency signal 28, or a third frequency signal 30 selected from a frequency selector 31. The first frequency signal 26 is selected when the transmitter 20 is mounted to a motorcycle. The second frequency signal is selected when the transmitter 20 is mounted to an emergency vehicle. The third frequency signal is selected when the transmitter 20 is mounted to a police car. The receiver 50 includes a durable housing 52 for holding the components and circuitry of the receiver 50.

The receiver 50 is operationally connected to the automobile's 90 main internal computer relay 92 with the required wiring 94 and is positioned in the automobile's dash 96 area for ease of access. The receiver 50 includes a sound emitting device 54 and a series of light emitting diode (LED) indicator lights 56. It is noted that elements 54, 56 are generally referred to as a transducer 99 in FIG. 4. The indicator lights 56 may be positioned atop the receiver 50. The indicator lights 56 include a first indicator light 61, a second indicator light 62, and a third indicator light 63. A specific indicator light 56 corresponding to a specific frequency signal flashes upon receipt of a unique frequency signal 24 from the transmitter 20 by the receiver 50.

The receiver 50 components and circuitry are frequency selective, which is crucial for presenting minimum impedance to signals generated on the unique frequency transmitted by the transmitter 20. The receiver 50 also includes a logic gate 98. Such a logic gate 98 generates a true output signal when both input signals from processor 55 are true. Processor 55 generates true input signals when the frequency signals 26, 28, 30 are verified as accepted frequency signals by a control logic algorithm as well as when the vehicles 80 distances are within a threshold range of the automobile 90.

The first indicator light 61 flashes upon receipt of the first frequency signal 26 from the transmitter 20 by the receiver 50. The second indicator light 62 flashes upon receipt of the second frequency signal 28 from the transmitter 20 by the receiver 50. The third indicator light 63 flashes upon receipt of the third frequency signal 30 from the transmitter 20 by the receiver 50.

The receiver 50 further includes a plurality of LED vicinity lights 58. The vicinity lights 58 may be aligned along a face 23 of the receiver 58. The vicinity lights 58 increasingly illuminate from left to right as a vehicle 80 increasingly approaches an automobile 90. The vicinity lights 58 may be displayed in a series of colors starting on the left with green, with yellow in the middle, and red on the right.

The present system 10 also utilizes an automobile's 90 side mirror 97, having similar functional characteristics of a display screen. A graphical user interface may be communicatively coupled to the side mirror 97 for displaying various vehicle 80 images thereon. The side mirror 97 is in operational communication with the receiver 50, as well. The side mirror 97 displays an image 70 of a specific vehicle 80 upon receipt of a unique frequency signal 24 from the transmitter 20 by the receiver 50. A first image 71 of a motorcycle is displayed upon receipt of a first frequency signal 24 from the transmitter 20 by the receiver 50.

A second image 73 of an emergency vehicle is displayed upon receipt of a second frequency signal 24 from the transmitter 20 by the receiver 50. A third image 72 of a police car is displayed upon receipt of a third frequency signal 24 from the transmitter 20 by the receiver 50.

In use, the motorcycle-emergency vehicle detection and notification system 10 transmitter 20 automatically activates upon selection of a unique frequency signal 24 for the type of vehicle 80 to which the transmitter 20 is mounted. The user selects the first frequency signal 26 upon mounting the transmitter 20 to a motorcycle, the second frequency signal 28 upon mounting the transmitter 20 to an emergency vehicle, and the third frequency signal 30 upon mounting the transmitter 20 to a police car.

The transmitter 20 sends unique frequency signals 24 from the frequency generating circuit 27 through a transceiver 29 to every automobile 90 equipped with a receiver 50 that is within a range of 300 feet, for example. The frequency signals 24 emit outwardly and forwardly from the vehicle 80 at an angle of approximately one hundred forty degrees (140°). Upon reception of the frequency signal 24 generated by the transmitter 20, the transceiver 51 in the receiver 50 activates a frequency verification element 53 in the receiver 50, for verifying whether the frequency signal 24 is an authorized signal that can be acknowledged by receiver 50.

The frequency generating circuit 27 is powered by a power supply source 32. The frequency verification element 53 is in operational communication with a processor 55. The frequency verification element 53 signals the processor 55 upon verification of a unique frequency signal 24, 26, 28, 30 from the transmitter 50. Upon receipt of a signal by the processor 55 having memory 65, the processor 55 generates two input signals to the logic gate 98. The first input signal is true if an acceptable object (motorcycle, vehicle, ambulance, etc.) is recognized. The second signal is true if the detected acceptable object 80 is located within a threshold range of 300 ft, for example. Otherwise, the first and second input signals are false.

The logic gate 98 is in operational communication with a transducer 99 which activates the proper indicator lights 56, the proper vicinity lights 58, and sound emitting device 54, when both the first and second input signals are true, thus warning a motorist in an automobile 90 equipped with a receiver 50. The processor also generates a third signal that is transmitted to the side view mirror 97, for displaying the proper vehicle image 70 on the side mirror 97. When activated, the indicator lights 56, the vicinity lights 58, sound emitting device 54, and vehicle image 70 on the side mirror 97 signify the presence of and type of vehicle 80 in close proximity to the automobile 90, thereby notifying the driver of the automobile 90 to pay extra attention while driving so as to not endanger the driver and occupants of a vehicle 80 equipped with the system's transmitter 20. A power supply source 91, such as a cigarette lighter, batteries, or stock car wiring harness, provides power to the receiver 50 components.

With respect to the above description then, it is to be realized that the optimum dimensional relationships for the parts of the present system, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the present system. Further, since numerous modifications and changes will readily occur to those skilled in the art, it is not desired to limit the present system to the exact construction and operation shown and described, and accordingly, all suitable modifications and equivalents may be resorted to, falling within the scope of the present system.

What I claim as my invention is:

1. A motorcycle detection and notification system for detecting said proximity of a vehicle to an automobile, said system comprising:

- a transmitter adapted to be attached to a vehicle, said transmitter comprising
  - a housing;
  - a frequency selector within said housing;
  - wherein one of a unique frequency signal is selected from said frequency selector;
  - wherein said unique frequency signals comprise a first frequency signal, a second frequency signal, and a third frequency signal;
  - wherein a unique frequency signal is generated by said transmitter upon selection of a frequency signal from said frequency selector;
- a receiver adapted to be attached to an automobile dashboard and further adapted to be in operational communication with an automobile computer relay;
- an automobile side mirror;
- said receiver further being in operational communication with said transmitter and said automobile side mirror;
- wherein said receiver generates a first image in said automobile side mirror upon receipt of a first frequency signal from said transmitter;
- wherein said receiver generates a second image in said automobile side mirror upon receipt of a second frequency signal from said transmitter;
- wherein said receiver generates a third image in said automobile side mirror upon receipt of a third frequency signal from said transmitter.

2. The system of claim 1, wherein said receiver further comprises:

- a plurality of light emitting diode indicator lights comprising a first indicator light, a second indicator light, and a third indicator light;
- wherein said first indicator light flashes upon receipt by said receiver of said first frequency signal generated by said transmitter;

wherein said second indicator light flashes upon receipt by said receiver of said second frequency signal generated by said transmitter;

wherein said third indicator light flashes upon receipt by said receiver of said third frequency signal generated by said transmitter.

3. The system of claim 2, wherein said receiver further comprises: a plurality of light emitting diode vicinity lights wherein said vicinity lights illuminate upon receipt by said receiver of a frequency signal generated by said transmitter.

4. The system of claim 3, wherein said vicinity lights are aligned along a face of said housing;

wherein said vicinity lights increasingly illuminate as a vehicle approaches an automobile.

5. The system of claim 4, wherein said vicinity lights progress in a series of colors starting on said left with green, with yellow in said middle, and red on said right.

6. The system of claim 5, further comprising: a sound emitting device wherein said sound emitting device emits a sound upon receipt by said receiver of a frequency signal generated by said transmitter.

7. A motorcycle detection and notification system for detecting said proximity of a vehicle to an automobile, said system comprising:

a transmitter adapted to be attached to a vehicle and further adapted to be in operational communication with a power supply of said vehicle, said transmitter comprising a housing;

a frequency selector within said housing;

wherein one of a unique frequency signal is selected from said frequency selector;

wherein said unique frequency signals comprise a first frequency signal, a second frequency signal, and a third frequency signal;

wherein a unique frequency signal is generated by said transmitter upon selection of a frequency signal from said frequency selector;

a receiver adapted to be attached to an automobile dashboard and further adapted to be in operational communication with an automobile computer relay;

an automobile side mirror;

said receiver further being in operational communication with said transmitter and said automobile side mirror;

wherein said receiver generates a first image in said automobile side mirror upon receipt of a first frequency signal from said transmitter;

wherein said receiver generates a second image in said automobile side mirror upon receipt of a second frequency signal from said transmitter;

wherein said receiver generates a third image in said automobile side mirror upon receipt of a third frequency signal from said transmitter.

8. The system of claim 7, wherein said receiver further comprises:

a plurality of light emitting diode indicator lights comprising a first indicator light, a second indicator light, and a third indicator light;

wherein said first indicator light flashes upon receipt by said receiver of said first frequency signal generated by said transmitter;

wherein said second indicator light flashes upon receipt by said receiver of said second frequency signal generated by said transmitter;

wherein said third indicator light flashes upon receipt by said receiver of said third frequency signal generated by said transmitter.

9. The system of claim 8, wherein said receiver further comprises: a plurality of light emitting diode vicinity lights wherein said vicinity lights illuminate upon receipt by said receiver of a frequency signal generated by said transmitter.

10. The system of claim 9, wherein said vicinity lights are aligned along a face of said housing;

wherein said vicinity lights increasingly illuminate as a vehicle approaches an automobile.

11. The system of claim 10, wherein said vicinity lights progress in a series of colors starting on said left with green, with yellow in said middle, and red on said right.

12. The system of claim 11, further comprising: a sound emitting device wherein said sound emitting device emits a sound upon receipt by said receiver of a frequency signal generated by said transmitter.

13. A motorcycle detection and notification system for detecting said proximity of a vehicle to an automobile, said system comprising:

a passive transmitter adapted to be attached to a vehicle and further adapted to be in operational communication with a power supply of said vehicle, said transmitter comprising a durable housing;

a frequency selector within said housing;

wherein one of a unique frequency signal is selected from said frequency selector;

wherein said unique frequency signals comprise a first frequency signal, a second frequency signal, and a third frequency signal;

wherein a unique frequency signal is automatically generated by said transmitter upon selection of a frequency signal from said frequency selector;

a receiver adapted to be attached to an automobile dashboard and further adapted to be in operational communication with an automobile computer relay;

an automobile side mirror;

said receiver further being in operational communication with said transmitter and said automobile side mirror;

wherein said receiver generates a first image in said automobile side mirror upon receipt of a first frequency signal from said transmitter;

wherein said receiver generates a second image in said automobile side mirror upon receipt of a second frequency signal from said transmitter;

wherein said receiver generates a third image in said automobile side mirror upon receipt of a third frequency signal from said transmitter.

14. The system of claim 13, wherein said receiver further comprises:

a plurality of light emitting diode indicator lights comprising a first indicator light, a second indicator light, and a third indicator light;

wherein said first indicator light flashes upon receipt by said receiver of said first frequency signal generated by said transmitter;

wherein said second indicator light flashes upon receipt by said receiver of said second frequency signal generated by said transmitter;

wherein said third indicator light flashes upon receipt by said receiver of said third frequency signal generated by said transmitter.

15. The system of claim 14, wherein said receiver further comprises: a plurality of light emitting diode vicinity lights wherein said vicinity lights illuminate upon receipt by said receiver of a frequency signal generated by said transmitter.

16. The system of claim 15, wherein said vicinity lights are aligned along a face of said housing;

wherein said vicinity lights increasingly illuminate as a vehicle approaches an automobile.

17. The system of claim 16, wherein said vicinity lights progress in a series of colors starting on said left with green, with yellow in said middle, and red on said right.

18. The system of claim 17, further comprising: a sound emitting device wherein said sound emitting device emits a sound upon receipt by said receiver of a frequency signal generated by said transmitter.

* * * * *